Nov. 20, 1962  G. E. BULLOCK  3,064,531
PROCESS FOR FORMING CONTACT LENSES
Filed May 31, 1960
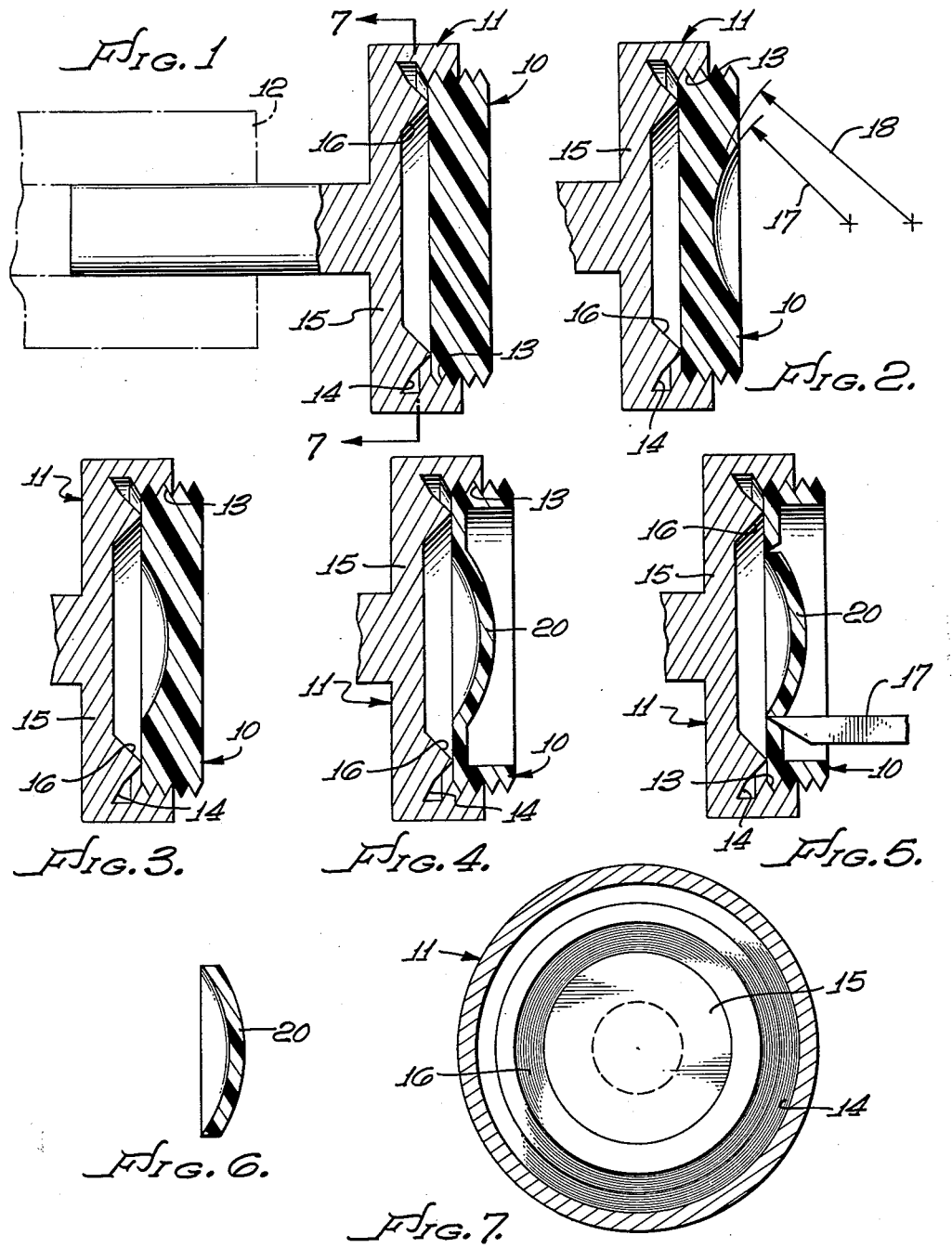
INVENTOR.
GILES E. BULLOCK
BY
ATTORNEYS.

3,064,531
PROCESS FOR FORMING CONTACT LENSES
Giles E. Bullock, 624 S. Mariposa Ave.,
Los Angeles 5, Calif.
Filed May 31, 1960, Ser. No. 32,632
4 Claims. (Cl. 88—54.5)

This invention relates to a method and apparatus for manufacturing contact lenses and more particularly such apparatus and method which reduces the complexity of the apparatus required and the number of steps and consequently the man-hours involved in the production of contact lenses.

It is accordingly one object of this invention to provide a more economical method for the production of contact lenses.

It is also an object of this invention to provide a method and apparatus for the production of contact lenses from a plastic material such as Lucite or Plexiglas wherein the stresses set up in the grinding process are communicated to the portion of the blank which is later to be discarded, so that the distortion in the plastic material resulting from the stresses is of no consequence.

These and other objects, features and advantages will be apparent from the annexed specification in which:

FIGURE 1 is a view partly in section of a chuck and lens blank embodying the present invention in a primary step of the invention.

FIGURE 2 is a section similar to FIGURE 1 of a chuck and lens blank showing a further step of the invention.

FIGURE 3 is a view similar to FIGURE 2 of a still further step in the invention.

FIGURE 4 is a similar view of a still further step in the invention.

FIGURE 5 is a view similar to FIGURE 4 showing a still further step in the invention.

FIGURE 6 is a section through a finished lens.

FIGURE 7 is a section taken along the line 7—7 of FIGURE 1.

Referring now more particularly to the drawings, the process and apparatus of this invention is as follows:

From a solid cylinder of plastic material such as Lucite or Plexiglas a blank 10 is cut after first being threaded in an automatic screw machine. The blank 10 is then threaded into a special chuck 11, as shown in FIGURE 1, which chuck is mounted in a precision lathe, a portion of which is shown at 12. The chuck 11 is internally threaded as at 13, so as to receive at least two threads of the blank 10 and has an annular recess 14 in the base thereof adjacent which an outwardly extending portion of the base 15 forming an annular member 16 having a V-shaped cross-section so as to present a line contact to blank 10 is formed. With the blank and chuck assembled as shown in FIGURE 1, the precision lathe having two radius positions and a periscopic lensometer attachment is operated. The first step is shown in FIGURE 2 and comprises the operation of the lathe to turn first the base curve from radius 16 and then the peripheral curve from radius 17 as indicated in FIGURE 2. The next step is to place the chuck in a polisher to first polish the base curve and then polish the peripheral curve. The blank 10 is then removed from the chuck 11, reversed and reinserted as shown in FIGURE 3. With the apparatus thus mounted the chuck is returned to the precision lathe to turn the outside radius as indicated in FIGURE 4. The next step is to polish the outside radius testing the same with the lensometer and inspect. Finally, in a precision lathe the lens 20 is cut off from the blank 10 as indicated in FIGURE 5. The edges are polished by hand and the lens is complete. It will be noted that during the forming and polishing steps the blank is supported only on the threads and on the line contact formed by the extension 16 and that in the cutting off step all of the material beyond the knife 17, being the portion of the lens blank which may have been under tension or compression, is discarded. Therefore, any distortion that may have been set up in the plastic due to such tension or compression is of no moment and the lens can be ground to extreme accuracy. As the plastic material being dealt with expands and contracts with variations in the temperatures and as the lens is designed to be in contact with the human body, care is taken to carry out the entire process at the normal temperature of the human body, or 98.6° F.

While there has been described what is at present considered the preferred embodiment of the invention, it will be understood by those skilled in the art that various changes and alterations may be made therein without departing from the essence of the invention and it is intended to cover herein all such changes and alterations as come within the true spirit and scope of the annexed claims.

I claim:

1. The method of manufacturing contact lenses comprising: the steps of threading a blank from a cylindrical stock; cutting off the blank; supporting the blank in a chuck solely from its threads and a line contact supporting ring on the base of said chuck; grinding one side of the lens; removing the blank from the chuck reversing the blank and returning the blank to the chuck; grinding the other side of the lens; cutting off the lens on a circle interior of the line contact and polishing the edge of the finished lens.

2. The method of manufacturing contact lenses comprising: the steps of threading a blank from a cylindrical stock; cutting off the blank; supporting the blank in a chuck solely from its threads and a line contact supporting ring on the base of said chuck; grinding one side of the lens; polishing said one side; removing the blank from the chuck reversing the blank and returning the blank to the chuck; grinding the other side of the lens; polishing said other side; cutting off the lens on a circle interior of the line contact and polishing the edge of the finished lens.

3. The method of manufacturing contact lenses comprising: the steps of threading a blank from a cylindrical stock; cutting off the blank; supporting the blank in a chuck solely from its threads and a line contact supporting ring on the base of said chuck; grinding one side of the lens; removing the blank from the chuck reversing the blank and returning the blank to the chuck; grinding the other side of the lens; cutting off the lens on a circle interior of the line contact and polishing the edge of the finished lens while maintaining said blank at substantially 98.6° F. temperature during the grinding and polishing and cutting steps.

4. The method of manufacturing contact lenses comprising: the steps of threading a blank from a cylindrical stock; cutting off the blank; supporting the blank in a chuck solely from its threads and a line contact supporting ring on the base of said chuck; grinding one side of the lens; polishing said one side; removing the blank from the chuck reversing the blank and returning the blank to the chuck; grinding the other side of the lens; polishing said other side; cutting off the lens on a circle interior of the line contact and polishing the edge of the finished lens while maintaining said blank at substantially 98.6° F. temperature during the grinding and polishing and cutting steps.

References Cited in the file of this patent

UNITED STATES PATENTS

| | | |
|---|---|---|
| 1,683,712 | Clark | Sept. 11, 1928 |
| 2,000,768 | Lincke | May 7, 1935 |
| 2,237,744 | Mullen | Apr. 8, 1941 |
| 2,437,436 | Mullen | Mar. 9, 1948 |
| 2,224,168 | Tillyer et al. | Dec. 10, 1948 |